United States Patent [19]

Blum et al.

[11] Patent Number: 6,093,299
[45] Date of Patent: Jul. 25, 2000

[54] STOVE-ENAMEL COATING MEDIA AND THE USE THEREOF

[75] Inventors: Joachim Blum, Remscheid; Klausjörg Klein; Hans-Peter Patzschke, both of Wuppertal; Bettina Vogt-Birnbrich, Solingen, all of Germany

[73] Assignee: Herberts Gesellschaft Mit Beschrankter Haftung, Wuppertal, Germany

[21] Appl. No.: 09/011,280

[22] PCT Filed: Aug. 13, 1996

[86] PCT No.: PCT/EP96/03578

§ 371 Date: Feb. 10, 1998

§ 102(e) Date: Feb. 10, 1998

[87] PCT Pub. No.: WO97/07170

PCT Pub. Date: Feb. 27, 1997

[30] Foreign Application Priority Data

Aug. 17, 1995 [DE] Germany .................. 195 30 225

[51] Int. Cl.[7] .................................................. C25D 13/06
[52] U.S. Cl. .................. 204/504; 204/507; 523/408; 523/414; 524/820
[58] Field of Search ................ 525/107; 204/504, 204/507; 523/408, 414; 524/820

[56] References Cited

U.S. PATENT DOCUMENTS

| 4,458,054 | 7/1984 | Schmözer et al. . |
| 4,683,285 | 7/1987 | Paar et al. . |
| 4,865,704 | 9/1989 | Saatweber et al. . |
| 5,021,502 | 6/1991 | Patzschke et al. . |
| 5,132,458 | 7/1992 | Honel et al. .............................. 564/367 |
| 5,431,791 | 7/1995 | December ............................ 204/181.7 |
| 5,856,382 | 1/1999 | Ohrbom .................................. 523/414 |

FOREIGN PATENT DOCUMENTS

| 0 149 156 | 7/1985 | European Pat. Off. . |
| 0 303 158 | 2/1989 | European Pat. Off. . |
| 0 356 970 | 3/1990 | European Pat. Off. . |
| 0 469 497 | 2/1992 | European Pat. Off. . |
| 0 661 354 | 7/1995 | European Pat. Off. . |
| 0 661 355 | 7/1995 | European Pat. Off. . |
| 41 29 753 | 11/1993 | Germany . |
| 43 30 002 | 3/1995 | Germany . |

OTHER PUBLICATIONS

Dec. 1996, International Search Report for PCT/EP96/03578.

Primary Examiner—Robert Dawson
Assistant Examiner—D. Aylward
Attorney, Agent, or Firm—Schwegman, Lundberg, Woessner & Kluth, P.A.

[57] ABSTRACT

This invention relates to a stove-enamel coating medium based on at least one binder vehicle selected from amino (meth)acrylate resins and/or epoxide-amine addition products comprising cationic groups and/or groups which can be converted into cationic groups. The binder vehicle additionally comprises cyclic carbonate groups and/or at least one crosslinking agent which comprises cyclic carbonate groups is present, and the binder vehicle also contains secondary amino groups and/or hydroxyl groups.

7 Claims, No Drawings

STOVE-ENAMEL COATING MEDIA AND THE USE THEREOF

The present invention relates to stove-enamel coating media which crosslink by an addition reaction without elimination losses occurring from the coating film, and to the use thereof for the cathodic electro-dip coating process.

In practice, coating media which harden are produced by different types of crosslinking mechanisms. In particular, amine resin crosslinking lacquer systems which crosslink via blocked polyisocyanates or by transesterification have become outstandingly important in this respect. A common feature of these lacquer systems—which are formulated based on organic solvents or which are preferably formulated with an aqueous basis—is that they suffer elimination losses on stoving. For example, etherification or esterification alcohols, formaldehyde, or blocking agents may be eliminated, which makes it necessary to purify the exhaust air discharged from the stoving kiln and constitutes an unwanted loss of lacquer solids. Those elimination products which condense in the stoving kiln and result in contaminants there are particularly problematical.

A cathodically depositable coating medium is known from EP-A-0 356 970 which can be stoved without elimination losses and which is based on a hydroxy-functional cationic resin and a polyepoxide crosslinking agent, the epoxide groups of which are bonded alicyclically. Lacquer systems of this type exhibit stability problems, and crosslinking reactions which result in gel formation can occur in the coating medium. Polyepoxide compounds can be problematical from an industrial hygiene point of view.

EP-A-0 661 354 describes a process for cathodic electro-dip coating (CEC) using a CEC coating medium based on a binder vehicle which comprises primary amine functions and on a crosslinking agent which contains cyclic carbonate groups in its molecule. These CEC coating media exhibit stability problems, and the binder vehicles on which they are based are preferably highly neutralised in order to deal with this problem (a typical degree of cathodic electrodeposition and thus result in unsatisfactory protection from corrosion during the CEC coating of three-dimensional substrates which comprise cavities, for example, automobile bodies.

The object of the present invention is to provide a coating medium which can be stoved without elimination losses, which exhibits no stability problems and which can be neutralised to a reduced extent.

The solution which achieves this object is the provision of a stove-enamel coating medium which contains one or more binder vehicles comprising cationic groups and/or groups which can be converted into cationic groups and comprising secondary amine and/or hydroxyl groups as well as one or more crosslinking agents comprising cyclic carbonate groups or a self-crosslinking binder vehicle comprising cationic groups and/or groups which can be converted into cationic groups, secondary amine and/or hydroxyl groups as well as cyclic carbonate groups, wherein the binder vehicles are selected from amino(meth)acrylate resins and/or from customary aminoepoxide resins produced by the addition reaction of amine compounds with the epoxide groups of epoxide resins. In this connection, epoxide resins are understood to be polyepoxide compounds which are not modified at their epoxide groups, preferably the known aromatic epoxide resins, most preferably those based on bisphenol A for example. Amines or amino alcohols which contain at least one primary or secondary amine group in their molecule can be employed as the amine compounds. If primary amine groups are present in the molecule of the amine compound, these are preferably not temporarily protected, for example as ketimine groups.

According to one preferred embodiment, stove-enamel coating media are provided which contain one or more binder vehicles which are free from primary amine groups and which comprise cationic groups and/or groups which can be converted into cationic groups, as well as secondary amine and/or hydroxyl groups, and which also contain one or more crosslinking agents comprising cyclic carbonate groups, or a self-crosslinking binder vehicle comprising cationic groups and/or groups which can be converted into cationic groups, and secondary amine and/or hydroxyl groups as well as cyclic carbonate groups, wherein the binder vehicles are selected from amino(meth)acrylate resins and/or from customary aminoepoxide resins produced by the addition reaction of amine compounds with the epoxide groups of epoxide resins.

The coating medium according to the invention can be a self-crosslinking coating medium or preferably an externally crosslinking coating medium i.e. the cyclic carbonate groups may be present in the binder vehicle which comprises cationic groups and/or groups which can be converted into cationic groups and which also comprises secondary amine and/or hydroxyl groups, or the coating medium preferably contains a separate crosslinking agent, which contains cyclic carbonate groups, for the binder vehicle, which has cationic groups and/or groups which can be converted into cationic groups as well as secondary amino and/or hydroxyl groups. Both the binder vehicle and the crosslinking agents which contain cyclic carbonate groups preferably contain substantially no epoxide groups.

The binder vehicle resins which are employed according to the invention are amino(meth)acrylate resins and/or customary aminoepoxide resins produced by the addition reaction of amine compounds with the epoxide groups of epoxide resins, which resins comprise cationic groups and/or groups which can be converted into cationic groups, and which comprise groups which contain active hydrogen and which are in the form of secondary amine and/or hydroxyl groups. They are preferably free from primary amine groups or from primary amine groups which are temporarily protected by protective groups, for example, ketimine groups. The basic groups which can be converted into cationic groups and the groups which contain active hydrogen may be completely or partially identical, i.e. the basic groups which can be converted into cationic groups may at the same time contain active hydrogen. The cationic groups or basic groups which can be converted into cationic groups which are particularly preferred are basic or cationic groups which contain nitrogen, such as amino groups and ammonium groups, wherein primary amine groups and ammonium groups derived therefrom are preferably excluded. For the purpose of attaining thinnability with water, these groups may be present in quaternarised form or they may be converted into cationic groups using a customary neutralising agent, e.g. an organic monocarboxylic acid such as formic acid or acetic acid, as is familiar to one skilled in the art. The amino groups which are present are preferably secondary and/or tertiary groups. They may be present in completely neutralised form, and preferably only in partially neutralised form, for example with a degree of neutralisation of 20 to 60%. The binder vehicle or binder vehicles contain secondary amine and/or hydroxyl groups comprising active hydrogen, corresponding to an equivalent weight of groups which contain active hydrogen of 150 to 1500 with respect to the solids content of the binder vehicle or binder vehicle mixture. Primary hydroxyl groups are particularly preferred as the hydroxyl groups. The sum of the hydroxyl number, particularly the primary hydroxyl number, plus the secondary amine number of the binder vehicle or binder vehicle mixture in the coating medium according to the invention is preferably between 40 and 350 mg KOH/g, most preferably between 50 and 250 mg KOH/g. The hydroxyl number, particularly the primary hydroxyl number, is preferably between 40 and 200 mg KOH/g.

Examples of basic amino(meth)acrylate resins and/or aminoepoxide resins which can be used as binder vehicles in the coating medium according to the invention include representatives which contain secondary and/or tertiary amine groups, the amine numbers of which (the sum of the secondary and tertiary amine numbers) amount to 20 to 250 mg KOH/g for example. The weight average molecular weight (Mw) of the resins is preferably 300 to 10,000. Examples of amino(meth)acrylate resins and/or aminoepoxide resins such as these include the amino(meth)acrylate resins and/or aminoepoxide resins comprising secondary amine groups and/or OH groups which are known to one skilled in the art as binder vehicles for cathodically depositable electro-dip lacquer systems. Descriptions of these resins and of synthesis routes which result in them are disclosed, for example, in EP-A-0 082 291, EP-A-0 178 581 and EPA-A-0 261 385. These resins can be used, on their own or in admixture, as the binder vehicle in the coating medium according to the invention.

The crosslinking agents which contain cyclic carbonate groups contain on average, two or more, preferably three or more, cyclic carbonate groups per molecule, corresponding to an equivalent weight of cyclic carbonate groups of 150 to 5000, preferably between 200 and 3000. The number average molecular weights (Mn) of the crosslinking agents which contain cyclic carbonate groups fall within the range from 350 to 30,000, and are preferably less than 10,000, most preferably less than 5000. Within the context of the present invention, cyclic carbonate compounds are to be understood as five- or six-membered cyclic carbonate groups, wherein five-membered 2-oxo-1,3-dioxolan-4'-yl groups are preferred. The cyclic carbonate group may be bonded to the crosslining molecule skeleton via the 4- and/or 5-position or via the 4-, 5- and/or 6-position. This can also be the situation, for example, for a constituent of a multiple ring system. The cyclic carbonate groups may contain substituents, e.g. alkyl groups, in the 4- and 5-positions or in the 4-, 5- and/or 6-position of the cyclocarbonate ring.

The cyclic carbonate groups are preferably bonded to the crosslinking molecule skeleton but are unsubstituted except for the covalent bond or covalent bonds.

Crosslinking agents which contain 5-membered cyclic carbonate groups can be synthesised from corresponding polyepoxide compounds, by the reaction of carbon dioxide with the oxirane rings of polyepoxide compounds. This can be effected under pressure and at elevated temperature, or catalysis at low pressure can be employed as described in DE-A41 29 753. In addition to the polyepoxide crosslinking agents listed in EP-A-0 356 970, examples of polyepoxide compounds from which the crosslinking agents which contain cyclic carbonate groups and which are used in the coating medium according to the invention can be synthesised by reaction with carbon dioxide also include polyglycidyl compounds such as polyglycidyl ethers, e.g. aromatic epoxide resins based on bisphenol A, polyglycidyl esters, epoxide-functional novolacs, epoxide-functional copolymers e.g. copolymers of glycidyl (meth)acrylate, epoxidised polybutadiene, or polyepoxide compounds which are synthesised by specific syntheses, e.g. addition products of epoxide-functional alcohols, such as 3,4-epoxytetrahydrobenzyl alcohol, with polyisocyanates, for example customary lacquer polyisocyanates; polyurethane prepolymers or (meth)acrylic copolymer which contain free NCO groups.

Alternatively, the crosslinking agents which contain cyclic carbonate groups can be specifically synthesised using suitable monomer compounds which contain a cyclic carbonate group, for example by the addition of hydroxy-functional cyclocarbonates, such as 4-hydroxymethyl-2-oxo-1,3-dioxolane, to polyisocyanates, for example, customary lacquer polyisocyanates; polyurethaneprepolymers or (meth)acrylic copolymers which contain free NCO groups.

The equivalent ratio of cyclic carbonate groups to secondary amine and/or hydroxyl groups in the coating medium according to the invention is preferably between 2:1 and 1:10.

In addition to the crosslinking agents which contain cyclic carbonate groups and which are essential to the invention, the coating media according to the invention may contain other crosslinking agents which are capable of reacting with the secondary amine and/or hydroxyl groups of the binder vehicle, even though this is less preferred. Examples of suitable crosslinking agents include amino plastic resins, blocked polyisocyanates, crosslinking agents comprising terminal double bonds, polyepoxide compounds, or crosslinking agents which contain groups capable of transesterification and/or transamidification.

In addition to the combination, which is essential to the invention, of one or more amino(meth)acrylate resins which are preferably free from primary amine groups and/or customary aminoepoxide resins which are produced by the addition reaction of amine compounds with the epoxide groups of epoxide resins and which are likewise preferably free from primary amine groups, comprising cationic groups and/or groups which can be converted into cationic groups as well as groups which contain active hydrogen and which are in the form of secondary amine and/or hydroxyl groups, as well as one or more crosslinking agents comprising cyclic carbonate groups, the coating media according to the invention may contain pigments, extenders and/or customary lacquer additives.

The stove-enamel coating medium according to the invention is a single-component coating medium which is stable on storage. The stove-enamel coating medium according to the invention can be formulated based on organic solvents; in this case the basic groups of the binder vehicle have preferably not been converted into cationic groups. However, it is preferably an aqueous stove-enamel coating medium, particularly a cathodically depositable aqueous stove-enamel coating medium, the water-thinnability of which results from the cationic stabilisation by the cationic groups in the binder vehicle, i.e. the binder vehicle used in the coating medium according to the invention either contains cationic groups or its basic groups are converted into cationic groups, by quatemarisation for example, or they are preferably converted into cationic groups using a customary neutralising agent, e.g. an organic monocarboxylic acid such as lactic acid, formic acid or acetic acid, as is familiar to one skilled in the art, wherein a degree of neutralisation between 20 and 60% is preferred according to the invention.

The CEC coating media which are preferred according to the invention are aqueous coating media with a solids content of 10 to 20% by weight for example. The solids content is formed from one or more amino(meth)acrylate resins which are preferably free from primary amine groups and/or customary aminoepoxide resins which are produced by the addition reaction of amine compounds with the epoxide groups of epoxide resins, comprising cationic groups and/or groups which can be converted into cationic groups as well as groups which contain active hydrogen and which are in the form of secondary amine and/or hydroxyl groups, as well as from one or more crosslinking agents comprising cyclic carbonate groups, and optionally from other crosslinking agents, pigments, extenders and/or customary lacquer additives also.

Examples of pigments and extenders include the customary inorganic and/or organic pigments such as carbon black, graphite, carbon of very different origins, titanium dioxide, iron oxide, kaolin, french chalk or silica, azo pigments, phthalocyanine pigments, and also anti-corrosion pigments such as zinc phosphate for example.

The pigments may be dispersed to form pigment pastes, e.g. using known paste resins. Resins such as these are familiar to one skilled in the art. Examples of paste resins which can be used in CEC baths are described in EP-A-0 183 025 and in EP-A-0 469 497.

The usual additives for CEC coating media are possible as additives. Examples thereof include wetting agents, neutralising agents, levelling agents, catalysts, anti-foaming agents, solvents, anti-crater additives, and light stabilisers, optionally in combination with anti-oxidants.

The CEC coating media according to the invention preferably contain catalysts for crosslinking, such as the metal compounds which are customary for this purpose. Examples include lead, zinc, titanium, iron and lanthanum compounds. The metal compounds with a catalytic effect which are contained in the CEC coating media according to the invention are preferably at least partially soluble in water. Lead acetate and iron acetylacetonate are examples of suitable water-soluble metal compounds. However, it is particularly preferred that the CEC coating media according to the invention are free from heavy metal compounds which are harmful to health; for example, they should be free from lead.

CEC coating media according to the invention which are particularly preferred are those which contain, as a catalyst, an addition of bismuth as bismuthates and/or in the form of organic bismuth complexes and/or as bismuth salts of organic carboxylic acids, particularly bismuth lactate and/or bismuth dimethylolpropionate, as described in DE-C-43 30 002.

CEC dispersions according to the invention can be produced by synthesising the aforementioned amino(meth) acrylate resins and/or aminoepoxide resins in the presence or absence of organic solvents, and the conversion thereof into an aqueous dispersion by diluting the binder vehicles, which have previously been neutralised with acid according to the invention and which have preferably only been partially neutralised, with water. The binder vehicle or binder vehicles may be present in admixture with one or more crosslinking agents comprising cyclic carbonate groups and may be converted into the aqueous dispersion jointly with the latter. If an organic solvent is present, it can be removed down to the desired content before or after conversion into the aqueous dispersion, for example, by distillation under vacuum. The subsequent removal of solvents can be avoided, for example, if the binder vehicles are neutralised with acid in a solvent-depleted or solvent-free state, e.g. as solvent-free melts at temperatures up to 140° C., and are subsequently converted with water into the CEC dispersion. It is also possible to avoid the removal of organic solvents if the binder vehicles are initially prepared as a solution in an olefinically unsaturated monomer which is polymerisable by a radical mechanism, or if the synthesis of the binder vehicle is conducted in a monomer which can polymerise by a radical mechanism (e.g. styrene) as a solvent, followed by conversion into an aqueous dispersion by neutralisation with acid and dilution with water, with the monomer which is polymerisable by a radical mechanism subsequently being polymerised out.

The coating media according to the invention, which are solvent-based or which are preferably aqueous, can be applied by the usual methods of application such as spraying or dipping, and can be applied in particular, in the context of a single-layer or multi-layer coating operation, by cathodic electrodeposition to different substrates which are electrically conductive or which are made electrically conductive, particularly to metal substrates such as automobile bodies or parts thereof, and they can be stoved. Typical stoving temperatures for coating films applied from the coating media according to the invention are 80 to 220° C., preferably between 120 and 180° C. The lacquer coats produced from the coating media according to the invention can be provided with one or more further lacquer coats.

The coating media according to the invention are stable, for example they exhibit no tendency towards premature ageing due to the commencement of crosslinking in the lacquer, and they enable crosslinking to be effected by stoving without the emission of elimination products. The CEC coating media which are preferred according to the invention can be neutralised with small amounts of acid, corresponding to what is only a partial neutralisation of the binder vehicle.

What is claimed is:

1. An aqueous stove-enamel coating medium for electrodeposition comprising an aqueous mixture of at least one binder vehicle selected from amino(meth)acrylate resins or epoxide-amine addition products or a combination thereof, which resins or addition products contain cationic groups and/or groups which can be converted into cationic groups, and contain secondary amino groups and/or hydroxyl groups, and wherein either the binder vehicle contains five- or six-membered cyclic carbonate groups or the coating medium includes at least one crosslinking agent which comprises five- or six-membered cyclic carbonate groups.

2. An aqueous stove-enamel coating medium according to claim 1, wherein the binder vehicle is free from primary amino groups.

3. An aqueous stove-enamel coating medium according to claim 1, wherein the equivalent weight of groups containing active hydrogen is 150 to 1500 with respect to the solids content of the binder vehicle.

4. An aqueous stove-enamel coating medium according to claim 1, wherein the sum of the hydroxyl number and of the secondary amine number is 40 to 350 mg KOH/g.

5. An aqueous stove-enamel coating medium according to claim 1, wherein the crosslinking agent is selected and has a number average molecular weight ($M_n$) of 350 to 30,000 and on average contains at least 2 cyclic carbonate groups per molecule, corresponding to an equivalent weight of cyclic carbonate groups of 150 to 1500.

6. An aqueous stove-enamel coating medium according to claim 1, wherein cationic groups are present and the degree of neutralization of the binder vehicle is 20 to 60%.

7. A method for cathodic electrodip coating comprising: contacting an electrically conductive substrate with an aqueous stove-enamel coating medium according to claim 1 wherein cationic groups are present in the binder vehicle and electrocoating conditions are applied.

* * * * *

UNITED STATES PATENT AND TRADEMARK OFFICE
CERTIFICATE OF CORRECTION

PATENT NO. : 6,093,299
DATED : Jul. 25, 2000
INVENTOR(S) : Blum et al.

It is certified that error appears in the above-identified patent and that said Letters Patent is hereby corrected as shown below:

In column 1, line 39, before "cathodic" add --neutralisation is at least 80% and the preferred degree of neutralisation is between 90 and 100%). Amongst their other effects, high degrees of neutralisation result in a deterioration of the wrap-around during --

Signed and Sealed this

Twenty-ninth Day of May, 2001

Attest:

NICHOLAS P. GODICI

Attesting Officer

Acting Director of the United States Patent and Trademark Office